United States Patent [19]
Heieis et al.

[11] Patent Number: 5,926,547
[45] Date of Patent: Jul. 20, 1999

[54] METHOD AND APPARATUS FOR PROVIDING PROGRAM/COMPONENT REDUNDANCY IN HEADEND

[75] Inventors: Mark R. A. Heieis; Leona Arlene Neufeld, both of Vancouver, Canada

[73] Assignee: Scientific-Atlanta, Inc., Norcross, Ga.

[21] Appl. No.: 08/811,883

[22] Filed: Mar. 5, 1997

[51] Int. Cl.⁶ .................................................. H04N 7/167
[52] U.S. Cl. .................................. 380/10; 380/2; 380/9; 380/20; 380/49; 348/6; 348/9; 455/3.1; 455/4.1; 455/6.1
[58] Field of Search ...................... 348/6, 9, 12; 455/3.1, 455/4.1, 5.1, 6.1, 6.3; 380/2, 9, 10, 20, 49, 59

[56] References Cited

U.S. PATENT DOCUMENTS 4,673,976   6/1987   Wreford-Howard ..................... 348/12

FOREIGN PATENT DOCUMENTS

1-99341   4/1989   Japan ....................................... 380/2

*Primary Examiner*—Bernarr E. Gregory
*Attorney, Agent, or Firm*—Kenneth M. Massaroni; Kelly A. Gardner; Hubert J. Barnhardt III

[57] ABSTRACT

In a communications system, a headend is provided with redundancy circuitry for video receivers, decoders, and modulation circuitry. The devices in the headend are monitored for failure, and when they fail, the channel being processed by the failing device is rerouted through redundancy circuitry to avoid the interruption of service to subscribers.

22 Claims, 4 Drawing Sheets

METHOD AND APPARATUS FOR PROVIDING PROGRAM/COMPONENT REDUNDANCY IN HEADEND

FIELD OF INVENTION

The invention generally relates to a communication system for delivering multimedia services to subscribers. More particularly, the present invention is directed to providing program redundancy in the headend to ensure successful transmission of multimedia services to subscribers.

BACKGROUND OF INVENTION

Figure 1A:
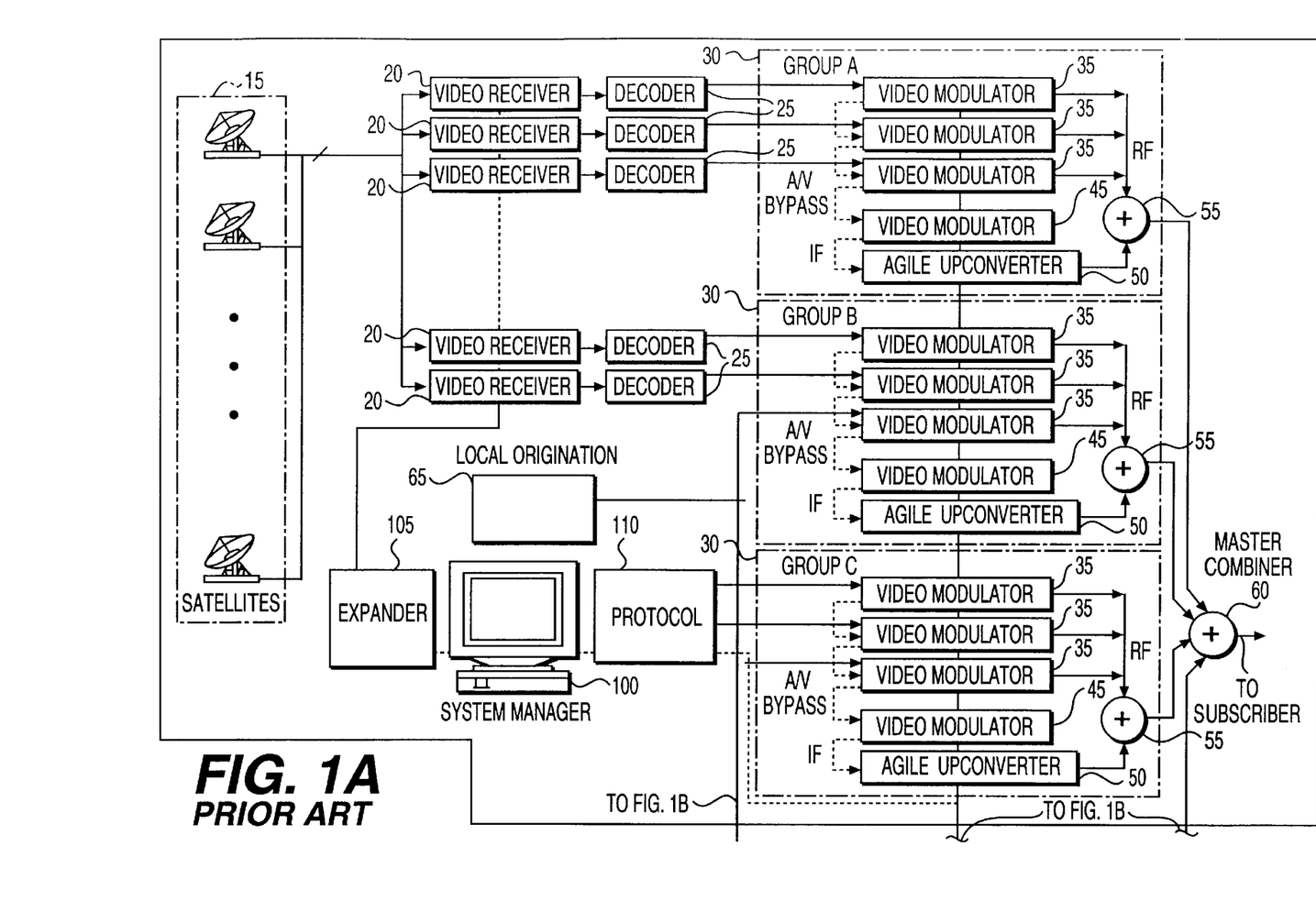
FIGS. 1A and 1B show a block diagram of a conventional communications distribution system.
Figure 1B:
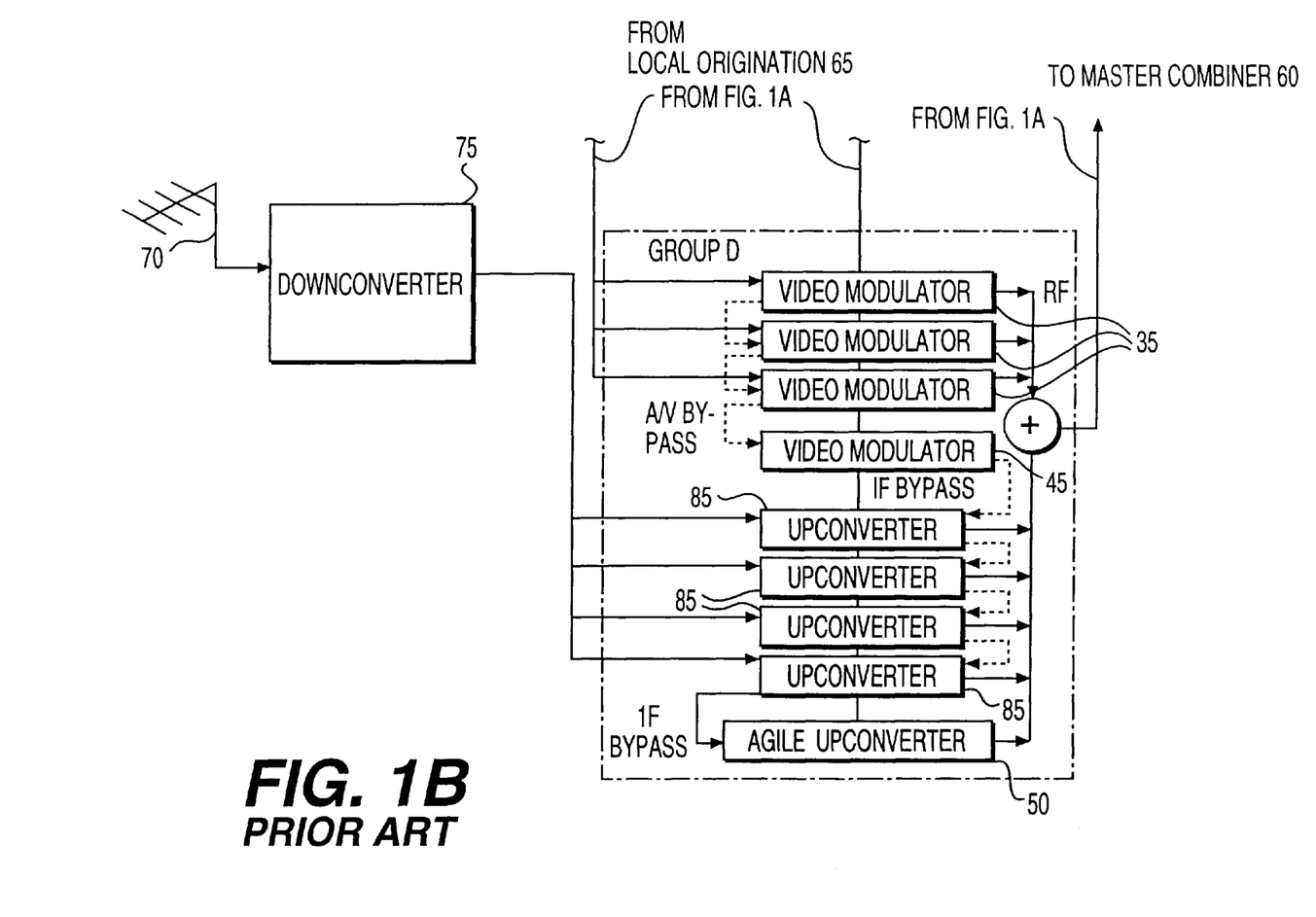

In cable television systems and the like, services are distributed by a headend to multiple subscribers. A conventional television service distribution system is shown in FIG. 1. According to FIG. 1, television programming may be received at a headend from multiple sources including, but not limited to, satellites, over the air broadcast antennas, and locally originated transmissions generated such as local or regional programming such as a local all news channel and the like. Satellites may include, but are not restricted to, Hotbird 1, Eutelsat 11-F1, Astra 1C, Intelsat 707, Tele X, Thor, Sirius, Astra 1D, Intelsat 601, TV Sat 2, and Astra 1A. Services typically include premium channels such as HBO and Showtime, impulse pay-per-view (IPPV) channels, basic cable channels such as ESPN, CNN, and MTV, and other channels.

According to the system of FIG. 1, the headend 10 receives services from the communications satellites 15. The headend 10 receives channels from the satellites 15 transmitted in the frequency spectrum (e.g., L-band) allocated to such communications. The headend 10 can be configured to receive a multitude of channels up to its channel carrying capacity. A typical headend may be configured to broadcast 120 channels to its subscribers. Of the 120 channels, 100 may constitute services from satellites, 12 may be over-the-air channels, and eight may be local origination channels.

The satellites 15 generally broadcast more than 100 services. Consequently, the headend 10 selectively receives services from the broadcasting satellites 15. The channels received from the satellites 15 are scrambled by the service providers to prevent unauthorized interception of the services by unauthorized receivers. The service providers are the organizations that generate the channels and send put them on the satellites 15 for distribution by authorized headend operators. The techniques for scrambling the channels include, but are not restricted to, sync inversion, line inversion, sync suppression, and many others known in the art.

The headend 10 includes one video receiver 20 per channel received from the satellites 15. Each video receiver 20 tunes to an L-band frequency associated with the selected channel received from the satellites 15. Thus, each video receiver acts as a different satellite signal receiver. Each received channel undergoes the same process when received at the headend. The video receiver 20 downconverts the received scrambled channel to baseband. A decoder 25 decodes and descrambles the baseband scrambled channel to recover a baseband audio/video channel. The decoder may be a standard D-MAC decoder known in the art. Each individual decoder 25 descrambles one received channel, and the specific descrambling technique employed from one decoder to another depends on the scrambling method originally used by the service provider in broadcasting the channel to the satellite 15.

The headend 10 includes one or more device units 30 for handling the channels distributed. For example, in FIG. 1, four units 30 (group A, group B, group C, and group D) are shown. It should be understood that the number of units may vary depending on factors like the number of channels.

The group A unit 30 includes video modulators 35, a video modulator 45, and an agile upconverter 50. Each video modulator 35 is operatively coupled to a respective one of the decoders 25, and modulates a received baseband audio/video channel to a uniquely assigned RF channel. A combiner 55 combines the RF channels and outputs the same to the master combiner 60. It is to be understood that any number of devices may be located between each video decoder 25 and its corresponding video modulator 35 to perform one or manipulations/modifications to the baseband audio/video channel prior to distribution to the subscribers. For example, devices for scrambling the channels for subscriber distribution may be necessary to prevent subscribers who do not subscribe to a particular channel from receiving the channel without the proper descrambler. Also, character insertion and screen overlays devices may be utilized.

In the group A unit 30, video modulators 35 are serially coupled together by the dashed lines shown and connected to video modulator 45. The video modulator 45 and agile upconverter 50 together provide unit level backup or redundancy for the video modulators 35 of the group A unit 30. When one of the video modulators 35 is inoperable or otherwise fails, the baseband audio/video channel directed to the inoperable video modulator 35 is rerouted to the video modulator 45. Any video modulators 35, between the failing video modulator 35 and the video modulator 45, bypass the baseband audio/video channel of the failing video modulator 35 to the video modulator 45. The video modulator 45 converts the baseband audio/video channel to an intermediate frequency. Then, the agile upconverter 50 upconverts the signal to the appropriate RF channel and sends the RF channel to combiner 55. The combiner 55 combines the redundant RF channel with the other RF channels output by the operable video modulators 35 of the group A unit 30. The group A unit 30 outputs a combined RF signal including a plurality of channels to a master combiner 60.

The group B unit 30 receives baseband audio/video channels from decoders 25 connected thereto. Local origination channels 65 in the form of audio/video channels are distributed to the group B unit 30, group C unit 30, and group O unit 30. The local origination channels 65 can include audio and video channels received by the headend 10 from a local studio or otherwise for distribution to the subscribers.

The group B unit 30 processes the received channels in the same manner as the group A unit 30 and outputs an RF signal including each of the received channels to the master combiner 60. The group C unit 30 receives locally originated channels 65 in the form of audio/video channels and processes the received channels in the same manner as the group A and B units 30 and outputs an RF signal including each locally originated channel to the master combiner 60.

The group D unit 30 receives locally originated channels 65 in the form of audio/video channels. Each video modulator 35 in the group O unit 35 modulates a received audio/video channel to a uniquely assigned RF channel, and the RF channels are combined by a combiner 55. In the group D unit 30, video modulators 35 are serially coupled together by the dashed lines shown and connected to the video modulator 45. When one of the video modulators 35 is inoperable or otherwise fails, the video modulator 45 receives the audio/video channel originally destined for the inoperable video modulator 35 and modulates the channel to a first frequency (e.g., IF).

The headend 10 receives over-the-air (off-air) channels via antenna 70. An RF-IF downconverter 75 coupled to the antenna 70, downconverts the channels from RF to IF. The downconverter 75 forwards the IF channels to upconverters 85 in the group D unit 30. Each upconverter 85 receives an IF channel input from the downconverter 75 and upconverts the received channel to a unique RF channel.

The video modulator 45 of the group D unit 30 and the upconverters 85 are serially coupled to the agile upconverter 50 by the dashed lines shown. When the video modulator 45 outputs a frequency channel when one of the video modulators 35 is inoperable or otherwise fails, the agile upconverter 50 upconverts the first frequency channel to a redundant RF channel. In this instance, the upconverters 85 bypass the IF channel to the agile modulator 50.

Also, when one of the upconverters 85 is inoperable or otherwise fails, the IF channel input to the inoperable upconverter 85 is forwarded to the agile upconverter 50 which provides redundancy for the upconverters 85 and upconverts the IF channel to a redundant RF channel. The combiner 55 of the group D unit 30 combines the RF channel outputs of the video modulators 35, upconverters 85, and agile upconverter 50 and forwards the RF channel output signal to the master combiner 60.

A system manager 100 generates various control signals to control the operation of devices in the headend. An illustrative system manager may be the IH-2000 intelligent headend manager from Scientific-Atlanta, Inc. The system manager 100 produces video receiver control signals which instruct each of the video receivers 20 to tune to a unique channel received from the satellites 15. An expander 105 receives the video receiver control signals from the system manager 100 over an RS-232 connection. The expander 105 places the video control signals in the appropriate protocol and passes the control signals to the video receivers 20. The system manager 100 also monitors the operability of the video modulators 35 and upconverters 85 in the device units 30. When one of the video modulators 35 or upconverters 85 in a unit is inoperable or otherwise fails, the system manager 100 generates a control signal which redirects the input of the failing device to the redundant portion of the unit 30. As described above, when one of the video modulators 35 fails, the input to the inoperable video modulator 35 is redirected to video modulator 45 and agile upconverter 50. Similarly, when one of the upconverters 85 fails, a control signal redirects the input thereof to the agile upconverter 50 as previously explained. This control signal can be routed through an RS-232 connector to a NEXBUS RS-485 connector via a protocol converter 110 to the video modulators 35, 45, agile upconverters 50, and upconverters 85.

The failure of any device at the headend can result in the interruption of a service. This can be particularly troublesome during certain services. Disruption of IPPV services such as a boxing match or a movie can result in a loss of revenue. Thus, it is important to provide continuous service to maximize revenues and maintain customer satisfaction. The number of video modulators 35 per video modulator 45 and agile upconverter 50 combination in a device unit 30 is based on the desired redundancy, and is a design choice. The more video modulators 35 per video modulator 45 and agile upconverter 50 combination, the more likely that two video modulators 35 in the same unit 30 can fail, resulting in a service disruption.

The above system provides limited unit level redundancy to account for inoperability of the video modulators and upconverters in the units. However, the above system and more generally the prior art has failed to provide redundancy for other devices in the headend. Devices such as decoders and video receivers can break down resulting in revenue losing service disruptions. In addition, due to the increase in unauthorized receivers pirating satellite signals, satellite programming distributors have scrambled their signals to minimize loss in revenue. The existing unit level redundancy cannot provide backup for devices that process the scrambled signals. Thus, if one of those devices is inoperable and fails, then service will be disrupted. Accordingly, there is a need in the art for a system which can provide redundancy for devices in the power path from reception of the services to output of the RF channels to the subscribers including the video receivers and decoders.

SUMMARY OF INVENTION

The present invention overcomes the problems associated with the prior art by providing a communications system in which the headend implements redundancy for other devices such as video receivers and decoders in the power path.

Unlike the prior art, the present invention supports scrambled signals and can maintain and protect the scrambled signal path. Scrambling techniques vary in signals received from different service providers through the satellites. One premium service may be scrambled using a technique different from another premium service. The present invention can support redundancy of the scrambled signals regardless of the technique employed to scramble the signal received from the satellite. As a result, the present invention can substantially reduce the likelihood of service interruptions by providing continuous service when a device in the service path fails.

A headend for distributing services in the form of a plurality of channels to subscribers according to an illustrative embodiment of the present invention includes a plurality of receivers for receiving scrambled channels, a plurality of decoders, each decoder operatively connected to a corresponding one of the receivers, for descrambling the scrambled channels, a plurality of modulators, each modulator modulating a respective one of the descrambled channels, and a system manager for monitoring the receivers and decoders for failure and generating a first redundant control signal when one of the receivers or decoders fails. The headend further includes first redundancy circuitry, for receiving the scrambled channels, selecting a scrambled channel based on the first redundant control signal, and generating a redundant modulated channel, and combining circuitry for combining the modulated channels and the redundant modulated channel to obtain an output signal and forwarding the output signal to subscribers. The headend may also include second redundancy circuitry, for modulating one of the descrambled channels, when the modulator for modulating the respective one of the descrambled channels fails. In addition, the system manager can monitor the modulators and generate a second redundant control signal for controlling the second redundancy circuitry. The first redundancy circuitry may include a plurality of different decoders, each decoder performing a different descrambling technique, wherein each scrambled channel can be descrambled by one of the decoders.

According to another exemplary embodiment, a headend which receives services in the form of a plurality of scrambled channels and distributes the services to subscribers includes a plurality of first signal paths including, one signal path for each scrambled channel received, each signal path including, a first receiver for receiving the scrambled channel and converting the scrambled channel to a scrambled baseband channel, a decoder for descrambling the scrambled baseband channel to produce a baseband channel, and a first modulator operatively coupled to the decoder for modulating the baseband channel. The headend also includes a second signal path, including, a selector for selecting the scrambled channel of one of the first signal paths when the receiver or the decoder in the one of the first signal paths fails, a second receiver for receiving the selected scrambled channel of the one of the first signal paths and converting the scrambled channel to a redundant scrambled baseband channel, decoding circuitry for descrambling the redundant scrambled baseband channel to produce a first redundant baseband channel, and a second modulator operatively coupled to the decoding circuitry for modulating the first redundant baseband channel to obtain a first redundant modulated channel. The headend also has combining circuitry for combining the modulated channel from each of the first signal paths and the first redundant modulated channel from the second signal path to obtain an output signal and forwarding the output signal to subscribers. A first scrambled channel can be scrambled by a first scrambling method and a second scrambled channel can be scrambled by a second scrambling method, wherein the decoding circuitry includes a first decoder for descrambling according to the first scrambling method and a second decoder for descrambling according to the second descrambling method.

A method according to an illustrative embodiment of the present invention provides redundancy in a headend including a plurality of receivers, each receiver receiving a scrambled channel, a plurality of decoders, each decoder operatively connected to a corresponding one of the receivers, for descrambling the scrambled channels, and a plurality of modulators, each modulator modulating a respective one of the descrambled channels. The method includes the steps of monitoring the receivers and decoders for failure, generating a redundant control signal when one of the receiver or decoders fails, redundantly receiving the scrambled channels, selecting one of the redundant scrambled channels according to the redundant control signal, descrambling the selected redundant scrambled channel to form a redundant baseband channel, modulating the redundant baseband channel to form a redundant modulated channel, and combining the modulated channels and the redundant modulated channel for broadcast to subscribers.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION

The present invention is discussed below with reference to a cable television communications network. However, the present invention may be extended to other types of communications networks and systems.

Figure 2A:
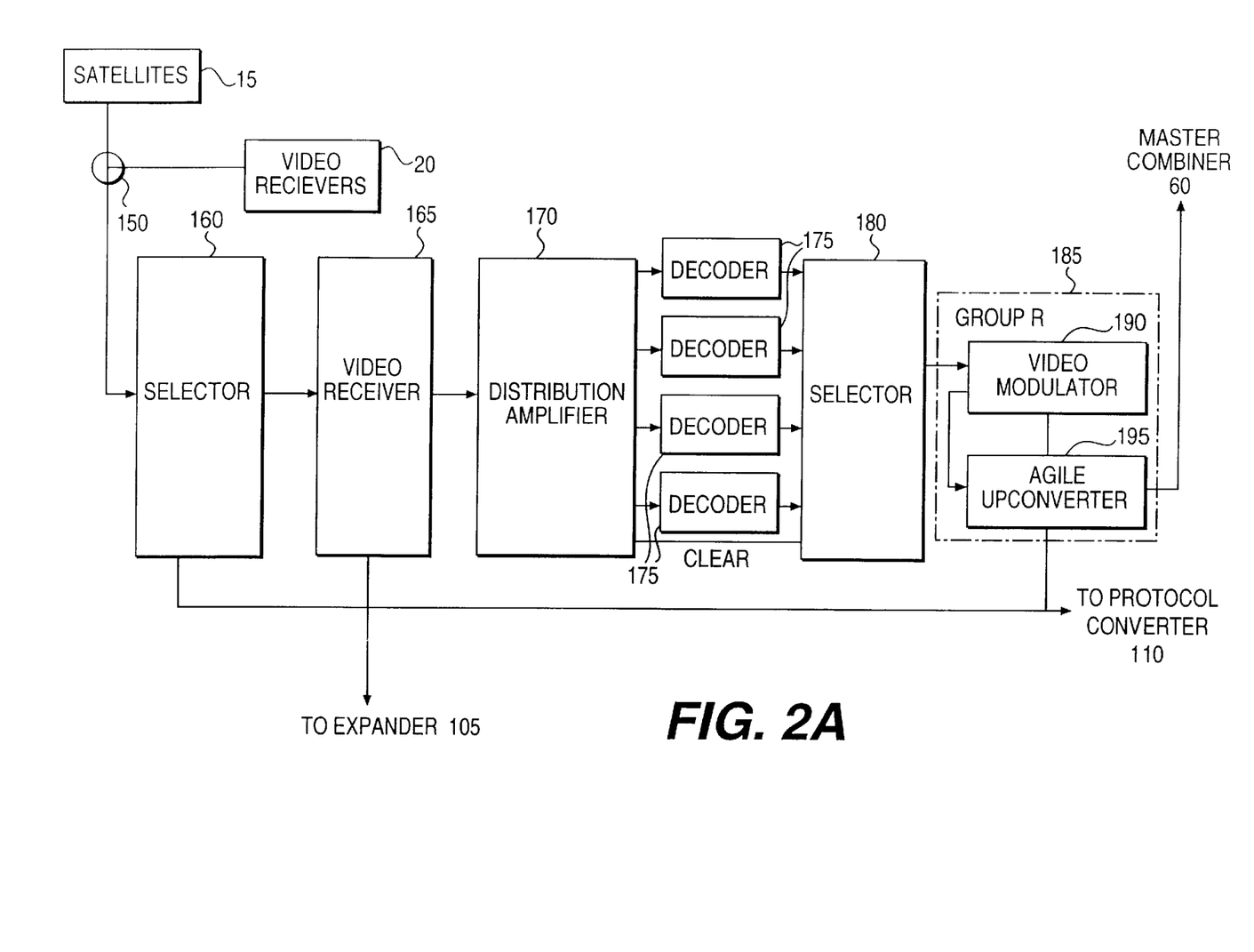
FIG. 2A is a block diagram of redundant circuitry for a distribution system according to an exemplary embodiment of the present invention.

FIG. 2A depicts redundant circuitry according to an illustrative embodiment of the present invention, which can be used with the communications system depicted in FIGS. 1A and 1B. Elements in FIG. 2A with the same reference numerals as elements in FIG. 1 perform in the same manner unless otherwise described. Accordingly, explanation of those elements would be repetitious and has been omitted. The illustrative embodiment of the present invention in FIG. 2A is described in connection with the communications system of FIGS. 1A and 1B. However, it is to be understood that the present invention can be extended to other communications system.

In FIG. 2A, a directional coupler 150 receives the input signals from satellites 15 and provides those signals to two separate signal paths. The signals are distributed on a first power path including the video receivers 20, decoders 25, unit 30, and master combiner 60 previously described with reference to FIGS. 1A and B. Typically, most if not all the signals received from the satellites 15 are scrambled. The first power path includes a series of paths, one for each particular channel received from the satellites 15. The second power path provides redundancy or backup for the first power path.

In the second power path, a selector 160 or smart switch receives the input signals from the satellites 15 via the directional coupler 150. Based on a first redundant control signal, the selector 160 selects one of the L-band satellite signals. The selector could be a 16:1 smart switch or a Scientific-Atlanta, Inc. 6228 smart switch.

The system manager 100 monitors the operation of all the elements in the first power path. As described with reference to FIGS. 1A and 1B, when one of the video modulators 35 in a unit 30 is inoperable, the input to the inoperable video modulator 35 is redirected to video modulator 45 and agile upconverter 50. Similarly, when one of the upconverters 85 in a unit 30 fails, a control signal redirects the input thereof to the agile upconverter 50.

When one of the video receivers 20 or decoders 25 in the first power path is not operational OR otherwise fails, the system manager 100 generates and outputs the first redundant control signal via the protocol converter 110. The first redundant control signal instructs the selector 160 to select and output the channel for which the corresponding video receiver 20 or decoder 25 has failed. Thus, the selector 160 outputs a selected channel in L-band frequency.

The system manager 100 also generates and sends a second redundant control signal via the expander 105 to video receiver 165. The second redundant control signal instructs the video receiver 165 to tune to the L-band channel received from the selector 160. The video receiver 165 may be a 9660 or 9661 video receiver manufactured by Scientific-Atlanta, Inc. The video receiver 165 downconverts the channel to a baseband audio/video channel.

A distribution amplifier 170 receives and amplifies the baseband audio/video channel. The decoders 175 receive the amplified baseband audio/video channel and attempt to descramble the same. Each decoder 175 performs a different descrambling technique on the baseband audio/video signal. Although FIG. 2A shows four decoders 175, the number of decoders needed depends on the number of different scrambling techniques employed by the service providers who broadcast the channels over the satellites 15 which are received by the headend 10.

A selector 180 receives the output of each decoder 175 and can receive the baseband audio/video channel directly from the distribution amplifier 170. The selector 180 receives the first redundant control signal which also ostensibly identifies the scrambling technique, if any, associated with the redundant channel. Based on the first redundant control signal, the selector 180 selects and outputs the redundant baseband audio/video channel from its input terminals. The selector 180 may be an 8:1 smart switch such as the Scientific-Atlanta, Inc. 6229.

A group R unit 185 includes a video modulator 190 and an agile upconverter 195. The video modulator 190 receives the redundant baseband audio/video channel from the selector 180 and modulates the signal to a first frequency channel (e.g., IF). Then, the agile upconverter 195 upconverts the redundant channel to RF and forwards the redundant RF channel to the master combiner 60 for combination with the other RF channels for distribution to the subscribers.

The present invention, as described, provides redundancy in the event that any of the video receivers 20 and decoders 25 fail. Accordingly, the present invention can provide redundancy through the complete first power path including the video receivers 20, decoders 25, and units 30 including the video modulators 35 and the upconverters 85. In this light, various other devices may be inserted between the decoders 25 and video modulators 35 including, but not limited to, scramblers and character inserters. Redundancy can be provided for these devices by inserting a redundant device (e.g., scrambler, character inserter, etc.) in the redundant signal path between the selector 180 and the video modulator 190, and when necessary, an appropriate redundant control signal can reconfigure the redundant device to match the characteristics of the device being backed up.

Although the above embodiment provides redundancy for a single channel at a time, it can easily be expanded by provisioning for two or more redundant circuits. In addition, certain channels/services could be divided between two or more redundancy circuits. For example, an independent redundancy circuit could be provided for each scrambling technique or half the channels could be assigned to one redundant circuit and half to the other. The number of redundancy circuits which is practical depends on the frequency that the first power path has multiple disruptions. The above modifications are within the scope of the present invention, and are design choices that can be carried out by one of ordinary skill in the art.

Figure 2B:
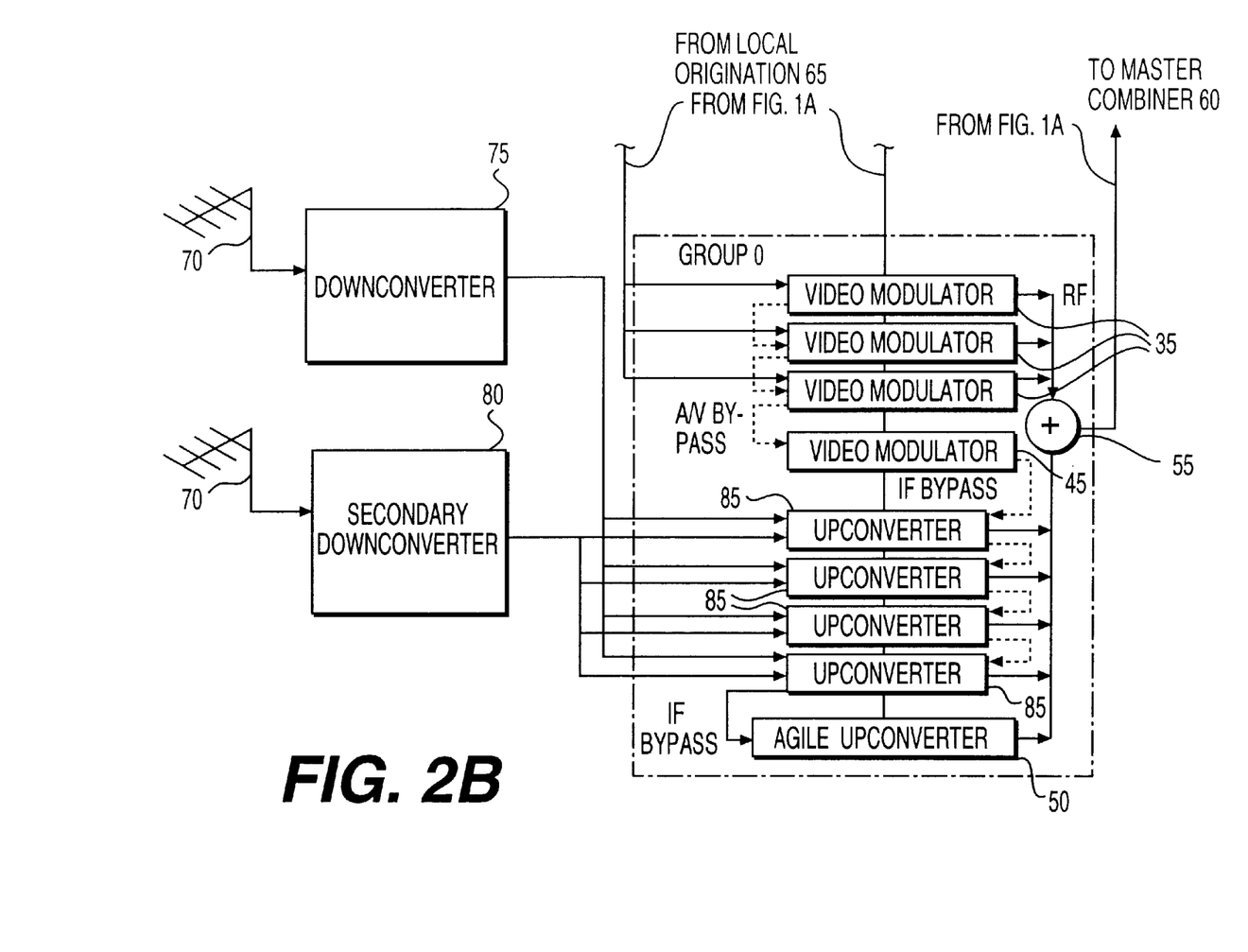
FIG. 2B is a block diagram of redundant circuitry for a distribution system according to another exemplary embodiment of the present invention.

FIG. 2B shows another embodiment of the present invention where "hot" redundancy for over-the-air channels is provided. It should be understood that FIG. 2B can replace the portion of the conventional system shown in FIG. 1B to form a novel system with the portion of the conventional system depicted in FIG. 1A according to an illustrative embodiment of the present invention. In addition, FIG. 2B can be combined with FIGS. 1A and 2A to form a distribution system according to another illustrative embodiment of the present invention.

As shown in FIG. 2B, the headend 10 receives over-the-air (off-air) channels via antennas 70. An RF-IF downconverter 75 and secondary RF-IF downconverter 80, coupled to the antennas 70, downconvert the channels from RF to IF. The downconverters 75 and 80 forward the IF channels to upconverters 85 in the group O unit 30. Each upconverter 85 receives two inputs, an IF channel input from the downconverter 75 and the redundant IF channel input from the secondary downconverter 80. Each upconverter 85 upconverts the received channel to a unique RF channel. The secondary downconverter 80 thus provides redundancy for the downconverter 75. The remaining elements of the group O unit 30 operate in the same manner as like elements in FIG. 1B.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A headend for distributing services in the form of a plurality of channels to subscribers comprising:

a plurality of receivers for receiving scrambled channels;

a plurality of decoders, each decoder operatively connected to a corresponding one of said receivers, for descrambling the scrambled channels;

a plurality of modulators, each modulator modulating a respective one of the descrambled channels;

a system manager for monitoring the receivers and decoders for failure and generating a first redundant control signal when one of the receivers or decoders fails;

first redundancy circuitry, for receiving the scrambled channels, selecting a scrambled channel based on the first redundant control signal, and generating a redundant modulated channel; and combining circuitry for combining the modulated channels and the redundant modulated channel to obtain an output signal and forwarding the output signal to subscribers.

2. The headend according to claim 1, further including second redundancy circuitry, for modulating one of the descrambled channels, when said modulator for modulating the respective one of the descrambled channels fails.

3. The headend according to claim 2, wherein said system manager monitors said modulators and generates a second redundant control signal for controlling said second redundancy circuitry.

4. The headend according to claim 1, wherein said first redundancy circuitry includes a plurality of different decoders, each decoder performing a different descrambling technique, wherein each scrambled channel can be descrambled by one of the decoders.

5. A headend which receives services in the form of a plurality of scrambled channels and distributes the services to subscribers, said headend comprising:

a plurality of first signal paths including, one signal path for each scrambled channel received, each signal path including, a first receiver for receiving the scrambled channel and converting the scrambled channel to a scrambled baseband channel, a decoder for descrambling the scrambled baseband channel to produce a baseband channel, and a first modulator operatively coupled to said decoder for modulating the baseband channel;

a second signal path, including, a selector for selecting the scrambled channel of one of the first signal paths when said receiver or said decoder in said one of the first signal paths fails, a second receiver for receiving the selected scrambled channel of said one of the first signal paths and converting the scrambled channel to a redundant scrambled baseband channel, decoding circuitry for descrambling the redundant scrambled baseband channel to produce a first redundant baseband channel, and a second modulator operatively coupled to said decoding circuitry for modulating the first redundant baseband channel to obtain a first redundant modulated channel; and combining circuitry for combining the modulated channel from each of the first signal paths and the first redundant modulated channel from the second signal path to obtain an output signal and forwarding the output signal to subscribers.

6. The headend according to claim 5, further comprising a system manager for monitoring the receivers and decoders for failure and generating a first redundant control signal when one of the receivers or decoders fails, the first redundant control signal controlling the selection of the scrambled channel by said selector and a tuning channel of said second receiver.

7. The headend according to claim 5, wherein a first scrambled channel is scrambled by a first scrambling method and a second scrambled channel is scrambled by a second scrambling method, and wherein said decoding circuitry includes a first decoder for descrambling according to the first scrambling method and a second decoder for descrambling according to the second descrambling method.

8. The headend according to claim 5, further comprising:
an off-air receiver for receiving off-air channels and converting the off-air channels to intermediate frequency channels; and
a plurality of upconverters coupled to said off-air receiver, each upconverter upconverting one of the intermediate frequency channels to an RF channel, wherein each RF channel is forwarded to said combining circuitry for combination with the modulated channel from each of the first signal paths and the first redundant modulated channel from the second signal path to obtain the output signal.

9. The headend according to claim 8, wherein said off-air converter includes:
a first downconverter for receiving a first off-air channel and a second off-air channel, converting the first off-air channel and the second off-air channel to a first intermediate frequency channel and a second intermediate frequency channel, respectively, and passing the first intermediate frequency channel to a first input of a first upconverter and the second intermediate frequency channel to a first input of a second upconverter; and
a second downconverter for providing redundancy for said first downconverter by receiving the first and second off-air channels, converting the first off-air channel and the second off-air channel to the first intermediate frequency channel and the second intermediate frequency channel, respectively, and passing the first intermediate frequency channel to a second input of the first upconverter and the second intermediate frequency channel to a second input of the second upconverter.

10. The headend according to claim 5, further comprising redundancy circuitry, operatively connected to one of said first decoders in one of the first signal paths when said first modulator in said one of the first signal paths fails, for receiving the baseband channel from said one of said first decoders in said one of the first signal paths and modulating the baseband channel to obtain a second redundant modulated channel, said redundancy circuitry forwarding the second redundant modulated channel to said combining circuitry wherein said combining circuitry combines the second redundant modulated channel with the modulated channel from each of the first signal paths and the first redundant modulated channel from the second signal path.

11. The headend according to claim 10, further comprising a system manager for monitoring the receivers and decoders for failure and generating a first redundant control signal when one of the receivers or decoders fails, the first redundant control signal controlling the selection of the scrambled channel by said selector and a tuning channel of said second receiver, and monitoring said first modulators and generating a second redundant control signal for controlling said redundancy circuitry.

12. A headend for distributing television services, the television services including scrambled channels broadcast over satellites, said headend comprising:
a directional coupler for routing scrambled channels received from at least one satellite, the scrambled channels including a first scrambled channel scrambled by a first scrambling method and a second scrambled channel scrambled by a second scrambling method;
a plurality of video receivers, coupled to said directional coupler, each video receiver tuned to a different one of the scrambled channels for converting a respective one of the scrambled channels to a baseband scrambled channel;
a plurality of decoders, each decoder coupled to one of said video receivers and for receiving and descrambling the baseband scrambled channel;
first video modulators, each first video modulator coupled to one of said decoders, for receiving and modulating the baseband channel;
first redundancy circuitry, coupled to said directional coupler, for receiving the scrambled channels and downconverting and descrambling one of the scrambled channels to a redundant baseband channel when one of said video receivers or said decoders fails in a signal path for the scrambled channel and modulating the redundant baseband channel; and
combining circuitry for combining the modulated baseband channel from said first video modulators and the redundant baseband channel from said first redundancy circuitry to obtain an output signal sent to subscribers.

13. The headend according to claim 12, further including second redundancy circuitry coupled to said decoders for receiving and modulating the baseband channel from one of said decoders when the first video modulator coupled to said one of said decoders fails to create a redundant modulated baseband channel, said second redundancy circuitry forwarding the redundant baseband modulated channel to said combining circuitry.

14. The headend according to claim 13, further comprising:
an off-air receiver for receiving off-air channels and converting the off-air channels to intermediate frequency channels;
a plurality of upconverters coupled to said off-air receiver, each upconverter upconverting one of the intermediate frequency channels to an RF channel, wherein each RF channel is forwarded to said combining circuitry; and
third redundancy circuitry coupled to said off-air receiver for receiving and upconverting one of the intermediate frequency channels to a redundant RF channel when the upconverter for upconverting the one of the intermediate frequency channels fails, said third redundancy circuitry forwarding the redundant RF channel to said combining circuitry.

15. The headend according to claim 14, wherein said off-air receiver includes
a first downconverter for receiving a first off-air channel and a second off-air channel, converting the first off-air channel and the second off-air channel to a first intermediate frequency channel and a second intermediate frequency channel, respectively, and passing the first intermediate frequency channel to a first input of a first upconverter and the second intermediate frequency channel to a first input of a second upconverter; and a second downconverter for providing redundancy for said first downconverter by receiving the first and second off-air channels, converting the first off-air channel and the second off-air channel to the first intermediate frequency channel and the second intermediate frequency channel, respectively, and passing the first intermediate frequency channel to a second input of the first upconverter and the second intermediate frequency channel to a second input of the second upconverter.

16. The headend according to claim 12, further comprising:

a local origination channel source for outputting local origination channels;

second video modulators, each second video modulator coupled to said local origination channel source and for receiving and modulating one of the local origination channels, wherein the modulated local origination channels are combined with the modulated baseband channel from said first video modulators and the redundant baseband channel from said first redundancy circuitry by said combining circuitry to form the output signal.

17. In a communications system, a method of providing redundancy for a first video receiver and a first decoder located at a headend, said method comprising the steps of:

receiving a scrambled channel with the first video receiver;

descrambling the scrambled channel using the first decoder to produce a baseband signal;

modulating the baseband channel with a first modulator;

distributing the modulated baseband channel to subscribers;

wherein when one of the first video receiver or the first decoder fail, redundantly receiving the scrambled channel as a redundant scrambled channel with the second video receiver;

descrambling the redundant scrambled channel with a second decoder to produce a redundant baseband channel;

modulating the redundant baseband channel; and distributing the redundant modulated baseband channel.

18. The method according to claim 17, wherein when the first modulator fails, redundantly modulating the baseband channel to produce a second redundant modulated baseband channel, and distributing the second redundant modulated baseband channel to subscribers.

19. The method according to claim 17, further comprising the steps of:

monitoring the first video receiver and the first decoder; and generating a redundant control signal to cause the second video receiver to receive the scrambled channel.

20. A method for providing redundancy in a headend including a plurality of receivers, each receiver receiving a scrambled channel, a plurality of decoders, each decoder operatively connected to a corresponding one of the receivers, for descrambling the scrambled channels, and a plurality of modulators, each modulator modulating a respective one of the descrambled channels, said method comprising the steps of:

monitoring the receivers and decoders for failure;

generating a redundant control signal when one of the receivers or decoders fails;

redundantly receiving the scrambled channels;

selecting one of the redundant scrambled channels according to the redundant control signal;

descrcmbling the selected redundant scrambled channel to form a redundant baseband channel;

modulating the redundant baseband channel to form a redundant modulated channel; and combining the modulated channels and the redundant modulated channel for broadcast to subscribers.

21. The method according to claim 20, further comprising the step of redundantly modulating one of the descrambled channels with a redundant modulator, when said modulator for modulating the respective one of the descrambled channels fails.

22. The method according to claim 21, further comprising the steps of:

monitoring said modulators for failure; and generating a second redundant control signal for controlling said redundant modulator when one of the modulators fails.

* * * * *